(12) United States Patent
Chung et al.

(10) Patent No.: US 8,903,030 B2
(45) Date of Patent: Dec. 2, 2014

(54) CLOCK DATA RECOVERY CIRCUIT WITH HYBRID SECOND ORDER DIGITAL FILTER HAVING DISTINCT PHASE AND FREQUENCY CORRECTION LATENCIES

(71) Applicant: Taiwan Semiconductor Manufacturing Co., Ltd., Hsin-Chu (TW)

(72) Inventors: Tao Wen Chung, San Jose, CA (US); Chan-Hong Chern, Palo Alto, CA (US); Ming-Chieh Huang, San Jose, CA (US); Chih-Chang Lin, San Jose, CA (US); Yuwen Swei, Fremont, CA (US); Tsung-Ching Huang, San Jose, CA (US)

(73) Assignee: Taiwan Semiconductor Manufacturing Co., Ltd., Hsin-Chu (TW)

( * ) Notice: Subject to any disclaimer, the term of this patent is extended or adjusted under 35 U.S.C. 154(b) by 34 days.

(21) Appl. No.: 13/670,519

(22) Filed: Nov. 7, 2012

(65) Prior Publication Data
US 2014/0126656 A1      May 8, 2014

(51) Int. Cl.
*H04L 7/00*     (2006.01)
*H04L 7/027*    (2006.01)

(52) U.S. Cl.
CPC ..................................... *H04L 7/027* (2013.01)
USPC ........... 375/355; 327/147; 327/156; 342/103; 375/215; 375/294; 375/327; 375/376; 455/180.3; 455/260

(58) Field of Classification Search
CPC .............. H04B 1/00; H04B 3/00; H04B 7/00; H04B 14/00; H04B 17/00; H04B 2001/00; H04B 2201/00; H04J 13/00; H04J 2013/00; H03K 7/00; H03K 9/00; H03L 7/00; H04L 1/00; H04L 5/00; H04L 7/00; H04L 25/00; H04L 27/00; H04L 2001/00; H04L 2007/00; H04L 2025/00; H04L 2027/00; H03M 5/00
See application file for complete search history.

(56) References Cited

U.S. PATENT DOCUMENTS

| | | | |
|---|---|---|---|
| 7,200,782 B2 | 4/2007 | Vining | |
| 7,724,862 B2 | 5/2010 | Menolfi et al. | |
| 7,916,822 B2 | 3/2011 | Aziz et al. | |
| 2005/0093595 A1 | 5/2005 | Rhee et al. | |
| 2011/0075781 A1* | 3/2011 | Kenney | 375/376 |
| 2011/0255643 A1 | 10/2011 | Fu et al. | |

OTHER PUBLICATIONS

Lee, H.C., "An Estimation Approach to Clock and Data Recovery", A Dissertation Submitted to the Dept. of Electrical Engineering and the Committee on Graduate Studies of Stanford University, Nov. 2006, © by H.C. Lee 2007, 122 pages.

* cited by examiner

*Primary Examiner* — Adolf Dsouza
(74) *Attorney, Agent, or Firm* — Duane Morris LLP

(57) ABSTRACT

A clock data recovery circuit (CDR) extracts bit data values from a serial bit stream without reference to a transmitter clock. A controllable oscillator produces a regenerated clock signal controlled to match the frequency and phase of transitions between bits and the serial data is sampled at an optimal phase. A phase detector generates early-or-late indication bits for clock versus data transition times, which are accumulated and applied to a second order feedback control with two distinct feedback paths for frequency and phase, combined for correcting the controllable oscillator, selecting a subphase and/or determining an optimal phase at which the bit stream data values are sampled. The second order filter is operated at distinct rates such that the phase correction has a latency as short as one clock cycle and the frequency correction latency occurs over plural cycles.

18 Claims, 5 Drawing Sheets

CLOCK DATA RECOVERY CIRCUIT WITH HYBRID SECOND ORDER DIGITAL FILTER HAVING DISTINCT PHASE AND FREQUENCY CORRECTION LATENCIES

BACKGROUND

This disclosure relates to clock and data recovery ("CDR") circuits, in particular having a second-order digital filter associated with the receiver of a serial data signal. The digital filter estimates the phase position of upcoming level transitions in the serial data signal, and a phase interpolator controls sampling to occur at an optimal time. The digital filter resembles a feedback control loop based on frequency and phase. According to one aspect, control latency is reduced by operating a feedback leg for phase information at a higher repetition rate than that of a parallel feedback leg for frequency information.

A plesiochronous timing configuration is defined as having no synchronizing clock signal coupling a serial data source and receiver, apart from the serial data signal itself. The transmitter encodes the serial data according to a transmitter clock signal. At the data receiver, synchronizing information is inferred from the timing of transitions that are found in the serial data signal, such as voltage or light level transitions. The timing of the data signal transitions is used to synchronize a local clock signal in the receiver with the transitions in the data.

Because the data content is arbitrary, transitions do not occur at every possible transition time. At times the data content can contain a succession of bits at an unchanging level, i.e., no transitions over plural successive data bit periods. The CDR receiver circuit has a controllable oscillator or a controllable delay that it seeks to operate to match the frequency and phase of the serial data signal. One might think that when no transitions occur in the data signal for a time, such that no information is available to update the controllable oscillator or delay in the receiver, the controllable oscillator/delay should be kept stable, at the last known frequency/phase condition of the data signal, until transitions resume. But the object advantageously is to anticipate the timing of the next transition. If the controls of the receiver clock were in the process of executing a change in frequency or phase when a hiatus in data transitions happened, it may be more effective to continue to execute that change, rather than to remain stable.

In a feedback control, each transition in the data contributes early/late information that can be applied to control the frequency/phase of the receiver clock. A second order digital filter in the feedback control has portions that respond separately to frequency and phase error. Thus the control can respond both to phase error and also to accumulating phase error. An accumulating phase error is a frequency error. The feedback control can anticipate the timing of future data level transitions. However, what are needed are circuits and techniques that optimize and improve the operation of such a control, especially by making the control highly responsive.

SUMMARY

An object of this disclosure is reduce the latency of feedback control in a clock data recovery (CDR) circuit that controls by anticipating for changes in phase and frequency (accumulating phase), specifically by operating the phase responsive loop of a second order filter at a faster rate than a frequency responsive loop of the same said second order filter, while anticipating the timing of the next transition in the serial data signal.

The input to the CDR control is a succession of comparisons each time a data transition occurs, indicating whether the data transition was earlier or later than expected. An early/late phase difference is one bit of information. Assessment of frequency information requires the accumulation of plural early/late phase comparison bits. Although the latency of the control loop for frequency needs to encompass plural comparisons, an object of this disclosure is to reduce the latency of the control to as short as one such bit interval.

These and other objects are achieved in a clock data recovery circuit (CDR) that extracts bit data values from a serial bit stream without reference to a transmitter clock. A controllable oscillator produces a regenerated clock signal based on a second order control configured to anticipate the timing of subsequent transitions in the serial bit stream. A phase detector generates early-or-late indication bits for clock versus data transition times, which are applied to a phase leg of a second order feedback control and accumulated in a frequency leg of said control. The output of the control selects an anticipated optimal phase timing at which the bit stream data values are sampled.

BRIEF DESCRIPTION OF THE DRAWINGS

These and other objects and aspects will be appreciated by the following discussion of certain embodiments and examples, with reference to the accompanying drawings, wherein.

DESCRIPTION OF EXEMPLARY EMBODIMENTS

Figure 1:
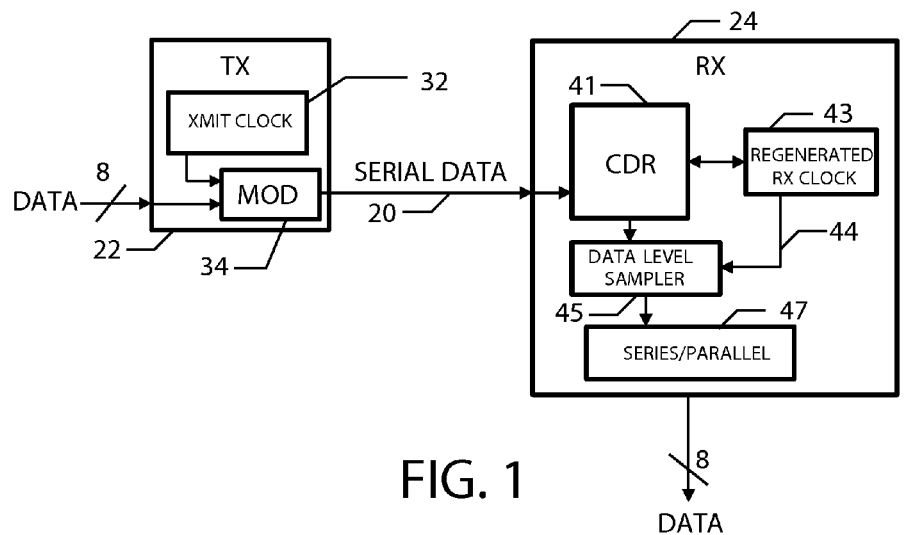
FIG. 1 is a schematic diagram showing a transmitter and receiver in a plesiochronous arrangement, the receiver including a clock data recovery (CDR) circuit.

A clock and date recovery apparatus is disclosed herein with level transitions in a serial data signal used to regenerate a clock signal at the receiver, which clock signal is synchronized to the timing of the serial signal, but not due to coupling to the transmitting clock and not by reference to a timing reference that is common to the sending and receiving devices. The clock is regenerated at the receiving device from a serial data signal alone. Clock transitions that occur in the serial data are sensed on at least one serial data transmission path. A clock signal is regenerated at the receiver and maintained by feedback controls to track both the frequency and phase of the serial data. The regenerated clock advantageously is the clock used for decoding the serial data by sampling at a phase position that is spaced from the transitions, as well as other potential purposes.

The regenerated clock signal is produced by controlling the frequency and phase of a locally generated oscillator signal (the regenerated clock signal) so as to synchronize with the transitions in the incoming data bit values. The control can include analog and/or digital elements such as voltage controlled oscillators, sigma-delta numeric timing schemes and similar arrangements. The input data to the control is based on early/late comparisons between the regenerated clock signal and level transitions in the serial data signal. Such comparisons are possible when level transitions occur in the serial data signal. Level transitions are typically frequent but are unpredictable because they are a function of data content.

The regenerated receiver clock is adjustable in frequency and phase position in a feedback control, responsive to control signals derived by comparing the timing of transitions in the regenerated clock signal versus the timing of transitions between bit values in the received serial data. Controllable oscillators and controllable phase delay devices are known for achieving synchronization with a source in a phase locked loop arrangement. Control of a CDR timing loop is more demanding than simply locking a controllable oscillator to the phase and frequency of a received clock signal, because level transitions in the data signal do not occur on every clock cycle, and at times the data signal may lack level transitions for an extended period of time. Moreover, according to the present disclosure the control of phase and frequency employs a second order filter that is configured to anticipate an optimal phase timing using frequency and phase information, not only to seek to accommodate a phase difference after it is detected.

A CDR clock regenerating oscillator and feedback control circuit may produce a number of phase subdivisions that are evenly spaced in the period of the regenerated receiver clock signal. Two phase angles that might be more or less spaced from one another are selected and used as limits that straddle a phase at which level transitions are expected to occur in the received data signal. An error signal is developed, for example by comparing counts of data transitions in the data over a given control period that were found to be early or late compared to an estimated time of arrival. A phase interpolator is then adjusted to optimize the phase of the regenerated clock. The phase(s) at which the serial data levels are sampled are spaced from the transitions into phase positions at which the levels are readily discriminated as being high or low levels.

In an at least partly digital implementation, the early/late error signal is a bitwise input to the second order control, but where no serial data transitions occur, the bits are missing. The feedback control can be based on a finite state machine having stored factors numerically representing a complex transmission function. A phase interpolator is responsive to a control output from the filter, and is operated to define a precise phase angle synchronized to the phase of the serial data bit stream, for example by producing a transition that is timed to fall at a timed phase position that is controlled to occur earlier or later in the phase span between two sub-phases that straddle the anticipated phase timing of the transition. The control repeatedly corrects by applying frequency and phase errors in a forward looking manner, thereby tracking the timing of the serial data bit stream without a connection to the transmitter clock that produced the serial data bit stream.

Having regenerated a local clock at the receiver, based on transitions in the data content, a phase timing point at which the data levels on the received signal are sampled is spaced from the phase angle of the transitions, for example by 90 and/or 270 degrees from the data level transitions. Thus the sampling occurs where data levels can be expected to be positively high or low. In high frequency serial devices, the transitions between data values may have considerable rise and fall times compared to the period of the applicable receiving clock. The optimum sampling point in the waveform, is where the so-called eye aperture has the widest difference in data levels. Although 90 and/or 270 degrees are nominally at intermediate times between zero and 180 degrees and may be the optimal phase for sampling in some systems, it is also possible in other systems that the optimal phase angle could be different than that, for example leading or trailing by some phase differential that offsets a propagation delay or for other reasons.

Even assuming that relatively stable and accurate oscillators are provided at a transmitter for encoding, and at a receiver for decoding, the lack of a clock signal connection between the transmitter and receiver, either directly or by common synchronization both the transmitter and receiver to some external clock reference source, means that the synchronization of the receiver and transmitter can drift relative to one another. If drift occurs, the phase position at which the receiver samples the serial signal moves away from the optimal sampling point between the phases as which level transitions occur in the serial data signal (or perhaps do not occur, if the data bit value has not changed). Sampling by the receiver at a phase other than the optimal point, namely nearer to the phase at which the data transitions occur, increases the incidence of data errors.

Two unsynchronized oscillators, for example in transmitting and receiving devices, typically operate at frequencies that are at least slightly different, meaning that the phase difference between the oscillator signals increases continuously, crossing $2\pi$ radians at some repeating rate, which can be a low rate if the two oscillators are stable and operating very near the same frequency. Two oscillators may be synchronized in frequency, but operating at an offset in phase angle.

Advantageously, a CDR feedback control is sensitive to frequency (continuously changing phase difference) and also phase (instantaneous phase difference), taking both parameters into account when estimating an optimal output for the phase interpolator. Such a feedback control can employ a second order filter, namely with two distinct feedback control paths that are separately devoted to accommodating frequency and phase, respectively. These two feedback control paths have different gains and different time constants for optimizing their objects.

An early/late phase detector simply compares whether the regenerated receiver clock (or a sub-phase of the receiver clock) is earlier or later than the data transition, if any, between successive bits. This is known as a bang-bang phase detector. If a majority of the sensed transitions that are encountered are found to be early or late, the regenerated receiver clock is adjusted accordingly. If continuous or frequent phase adjustments of the same polarity are called for, a frequency difference may be inferred after some number of iterations, and a subsequent or continuing need for adjustments of the same polarity may be anticipated. If the transitions are more evenly or randomly "early" and "late," one may infer that no adjustment is needed. These interests are mathematically represented in the two distinct phase and frequency legs of the second order filter.

FIG. 1 shows a transmitter-to-receiver data communication configuration wherein a serial data path 20 is provided between transmitter 22 and receiver 24, but there is no clock signal by which the decoding of data at the receiver 24 can be synchronized with the encoding of data at the transmitter 22. The timing synchronization between the clock 32 in the transmitter, for transmitting the serial data stream via a modulator 34, are to be extracted from the serial data stream by the receiver 24. This is by definition a plesiochronous configuration.

The receiver 24 includes a clock data recovery (CDR) element 40, which is explained in further detail below. The CDR 40 operates a feedback control loop to control a regenerated clock signal source 43, and outputs a synchronizing signal 44 to enable a demodulator 45 to extract the serial data values. In the examples discussed herein, extracting the data involves sampling the instantaneous level of the serial data signal. The object of the CDR is to control the frequency and phase of the regenerated clock from source 43, including estimation and selection of the optimal phase position at which the data level sampler will be triggered, based on the phase and frequency experience up until that time. Levels are normally sampled at a phase angle that is between transitions, e.g., at 90 and/or 270 degree phase positions compared to transitions that potentially occur in the data (depending on changes in bit value) at 0 degrees, 180, 360, etc.

Phase and frequency comparisons of two signals are related concepts. Even if the frequencies of two sources are exactly equal, there may be a phase difference between the points at which clock transitions and data level transitions occur. When the frequencies are unequal or drifting, a phase difference occurs. When a phase difference is accumulating over time, then the frequencies are not equal.

Figure 2:
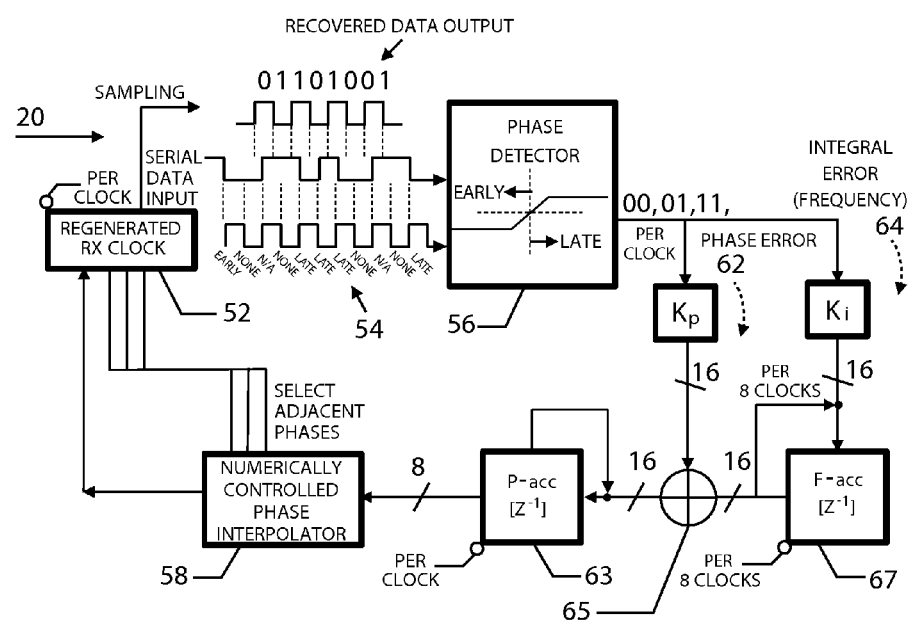
FIG. 2 is a block diagram showing an implementation of the CDR element in FIG. 1.

With reference to FIG. 2, a clock data recovery apparatus is shown for extracting successive bit data values ("recovered data output") from a serial bit data stream 20 which has been encoded with level transitions occurring between at least some successive bits in the bit data values. The level transitions conform to a transmit frequency and a transmit phase position from a transmitter, which is not shown in FIG. 2 and for which there is no synchronizing data connection or reference.

A controllable oscillator or delay 52 produces a regenerated clock signal 54 having level transitions with a selected phase and a frequency within a controllable range encompassing the transmit frequency. The controllable oscillator/delay 52 is responsive to one or more control inputs, and produces at least one phase output, and optionally a plurality of relatively rotated sub-phases that are synchronized but have a static phase difference. At least one phase output (which can be one of the sub-phases or a phase interpolated variation thereof) has level transitions that are anticipated to correspond in time with the transitions between adjacent bit values in the serial data input signal 20. That phase output or sub-phase is compared to the serial input signal at a phase detector 56. A function of the phase detector 56 is to produce an output value identifying whether a transition encountered in the data signal 20 is early or late compared to the phase output from the regenerated clock 52 that was anticipated to correspond to the data transition.

The phase detector 56 thus produces at least one logical bit value for each data bit at which a transition occurred, indicating whether the transition between successive data bits was early or late compared to the corresponding transition in the clock data signal. The serial data bit sequence might have been such that no transition was encountered in the data near a transition in the regenerated clock. Also, the data signal may have contained noise or the data signal and the clock may have gone 180 degrees out of phase. The output of the phase detector 56 can be provided at two or more phase detector output bits per serial data bit to accommodate differences such as transition present versus transition absent, rising transition versus falling transition, etc.

The phase detector 56 is configured to detect a timing relationship between the level transitions of the regenerated clock signal 54 versus the level transitions occurring at least intermittently between the bit data values in the serial data input signal 20. The phase detector 56 produces an output representing a phase timing difference between the serial data input signal bit stream 20 and the reference output 54 of the controllable oscillator 52. The phase detector output bits are employed as feedback to the second order control.

A different sub-phase, or alternatively a clock output that is adjusted by a phase interpolator 58, is the sampling signal to trigger the sampling that extracts the recovered data output, shown as a string of bits in FIG. 2. In an example, the transitions in the sampling clock can be timed to fall at 90 and 270 degrees in the phase of the regenerated clock that is aligned to expected level transitions in the data values.

A second order digital filter control arrangement as shown in FIG. 2, has an output coupled to the control inputs of the controllable oscillator 52. The feedback control has two control loops, or more particularly, two connected legs 62, 64 that respectively are configured to respond to phase and frequency differences between the data transitions and the regenerated clock. The two legs 62, 64 receive and accumulate bitwise data values from the phase detector 56 for control based on phase difference (leg 62) and integrated phase difference, which equates with frequency difference (leg 64). The two loops have distinct weighting factors $K_p$ and $K_i$ and timing factors. The weighted integrated phase difference data is applied to a finite state filter element 67 and supplies a phase difference output value that is summed with the static phase difference value at a summing junction 65. The summed phase correction value is applied to a second finite state filter element 63 that likewise has weighting and timing factors.

The control output is applied as an input to the phase interpolator 58 and regenerated RX clock oscillator 52, which produce a regenerated clock signal 54 that corresponds to the transitions that are expected to occur in the serial data stream. At least one sub-phase for sampling is included in the outputs of the phase interpolator. The sampling sub-phase is related to the regenerated clock signal by a phase difference that is estimated or expected to be the optimal synchronization for sampling. In the foregoing description, sampling at 90 and 270 degrees phase difference is only an example. Using the numerically controlled phase interpolator 58 and an 8 bit input as shown, a phase position between any two selected sub-phases can be selected for sampling and/or for bringing the reference output from the regenerated RX clock 52 into frequency and phase lock with the serial data stream 20.

The CDR estimates the frequency offset and uses the offset to predict the future phase position. In the second order dual loop as shown, a frequency tracking loop applies a gain ($K_i$) and a frequency accumulator (F_acc). The phase and frequency accumulators contain digital estimates of the respective quantities. $K_P$ and $K_i$ refer to the proportional and integral gains that also represent the rate of update of the phase and frequency estimates. $K_D$ is the conversion gain of phase difference updated at the rate of the least significant bit (LSB). The LSB is from the phase difference (not from the phase accumulator P_acc) which encompasses plural bits and can have a higher resolution. The digital phase estimated output is a real number in units of phase difference. Both the digital frequency estimate and the proportional gain (Kr) are in units of LSB per cycle. The integral gain ($K_i$) is in units of LSB per plural cycles.

It is an aspect of this disclosure that the inherent latencies differ for the two feedback error signal processing legs 62, 64, that process the error signal for phase and frequency, respectively. At least the feedback loop for minimizing the frequency error operates over a succession of multiple cycles of the regenerated clock, representing a succession of multiple bits in the data stream and multiple instances of early/late phase detections by phase detector 56 as necessary to characterize accumulated phase difference (also known as frequency difference). As a result, if a frequency difference suddenly arose, the corresponding change in anticipated phase difference at the output of the finite state machine 67 would emerge after the number of cycles that are encompassed in the phase accumulator.

According to this disclosure, the feedback loop for minimizing phase error, which can be a static phase difference discerned (at least as to early/late polarity) in a single data bit clock cycle, is operated at a smaller latency. The phase error data correction loop 62 at least has a latency corresponding to fewer cycles of the regenerated clock than the integral error data correction loop 64. In one embodiment, the phase error loop is operated at a latency of one data bit (i.e., one regenerated clock cycle).

Therefore, the input to the phase interpolator 58 coupled in the feedback control to adjust the regenerated clock 52 corrects for both phase and frequency error, but phase corrections can be accomplished bit by bit in an embodiment wherein the feedback loop for minimizing said phase error operates on individual cycles of the regenerated clock, whereas frequency corrections are relatively slow. The phase interpolator 58 is responsive to the feedback control (loops 62, 64) for at least one of selecting a phase of the regenerated clock signal, adjusting a phase of the regenerated clock signal, and timing sampling of the bit data values in the serial bit data stream.

The feedback loops have gain factors and latencies in that the early/late outputs of the phase detector for successive cycles of the regenerated clock are inputs that are shifted through the feedback control finite state machines in a pipeline succession, which at least for leg 64 and machine 67 encompasses multiple clock cycles, such as a number of successive bits or clock cycles corresponding to a digital word.

In any case, the feedback control comprises a second order filter with two control loops 62, 64, respectively responsive to phase and frequency errors, the two control loops having distinct gains (K), accumulations and transfer functions (P [$Z^{-1}$]), and the outputs of the two control legs are combined in a numerical output representing a phase difference value, coupled to the phase interpolator 58 and/or controllable clock 52.

Figure 3:
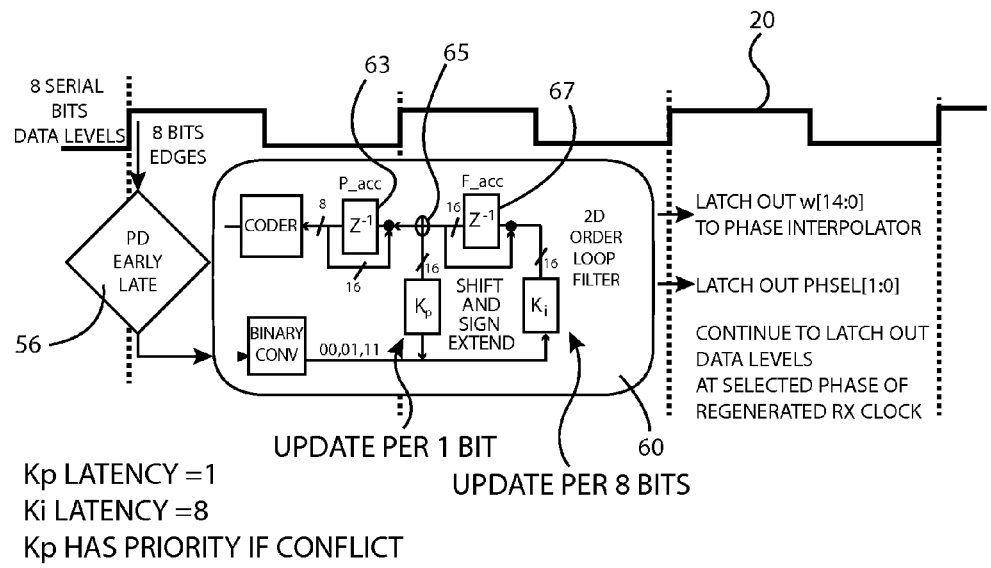
FIG. 3 is a partly schematic flow chart that relates the bit rate of a serial data transmission to phase detection and second loop filter operation, in an exemplary embodiment of the disclosed techniques.

FIG. 3 represents a combination of a flowchart and a timing diagram based on successive cycles of the serial data signal 20. As shown in FIG. 3, the phase detector 56 can make an early/late determination at every transition of the RX clock and the serial data signal 20 (assuming that a transition occurs in the serial data). The second order feedback loop filter 60, shown schematically, is the same as described in FIG. 2. In particular, the early/late indicator bits 00, 01, 10, 11, etc. are applied through scaling factors $K_p$ and $K_i$ to accumulators 63, and 67 that respectively process predicted phase position in a phase leg of the second order filter (scaler $K_p$ and accumulator P_acc) and predicted frequency in a frequency leg of the filter (scaler $K_i$ and frequency accumulator F_acc). The frequency leg integrates the phase difference over plural clock cycles (such as a memory word of eight or sixteen bits). Therefore, a new frequency prediction is available with a latency at least equal to the corresponding number of plural clock cycles. According to an aspect of this disclosure, the phase leg of the second order filter nevertheless is updated more frequently than the frequency leg, for example at every clock transition or cycle, compared to updating of frequency leg ever eight transitions or cycles.

The phase detector in one embodiment is a simple early/late timing comparison circuit (sometimes termed a bang-bang phase detector) producing for each level transition in the data bit stream at least a one bit indication of whether the level transition in the data stream was early or late compared to a transition in the regenerated clock signal. Other phase detection arrangements can be based on timed phase differences that carry more information the early-or-late information alone, such as an indication that a level transition was not found in the data signal during the interval where a transition is possible, in which case that interval can be ignored rather than being tentatively processed as one of the late/early result values.

The subject matter has been discussed specifically with reference to recovering both clock and data information, but is generally applicable to plesiochronous timing configurations for recovering a clock signal alone or a clock signal plus the data bit stream from which the clock signal is inferred by locking onto the frequency and phase of level transitions that occur at least intermittently between changing bit values. In general terms the apparatus has a receiver 24 coupled to the serial data bit stream 20, the receiver lacking external synchronization with the transmitter clock 32 from which the data was encoded or previously recorded or otherwise composed. A clock data recovery circuit 41 having a controllable oscillator 43 produces a regenerated clock signal 44 having level transitions. A phase detector 56 compares a timing of the level transitions in the regenerated clock signal 54 to the level transitions in the serial data bit stream 20 to produce an error signal. A feedback control (62, 64, 67, 65, 63) responsive to the error signal, and a phase interpolator or other input responsive to the feedback control, adjust the controllable oscillator 52. The feedback control comprises a second order filter with two control loops 62, 64 respectively responsive to frequency and phase errors. The control loop 62 responsive to phase errors is operated at a faster rate than the control loop 64 responsive to frequency errors.

Where the apparatus extracts data as well as regenerating a clock based on the data, a timing circuit produces a sampling trigger with a phase relationship to the regenerated clock so as to produce a recovered data output by sampling at a phase position that is estimated to be optimal for minimizing the data error rate. The relationship between the sampling trigger signals and the regenerated clock can be based on one or more of controllable delay, selection among sub-phases and interpolation of a phase angle between selected sub-phases. In an example, the sampling can assume an optimal sampling phase at one or both of 90 and 270 degrees from a clock transition.

In addition to the apparatus aspects discussed, the present disclosure encompasses a method for extracting data from a serial bit data stream containing variable bit data values encoded using level transitions conforming to a bit frequency and a phase. An embodiment of the method is illustrated in FIG. 3, in a flow chart form superimposed on a clock signal. The method comprises producing a regenerated clock signal from a controllable frequency source having a frequency control range encompassing the bit frequency; detecting an early-or-late timing relationship between transitions in the regenerated clock signal and transitions that occur between at least some of the bit data values; accumulating data values representing the early-or-late relationship for successive cycles of the regenerated clock, and estimating in two distinct feedback control paths a frequency error and a phase error between the regenerated clock and the serial bit data stream; combining correction signals for offsetting the frequency error and the phase error; applying a phase correction to the regenerated clock for at least one of offsetting the frequency error, offsetting the phase error, selecting a reference sub-phase for sampling the bit data values in the serial bit data stream, and triggering sampling of the bit data values in the serial bit data stream; and, operating the two distinct feedback control paths such that correction of the phase error encompasses fewer cycles of the regenerated clock than correction of the frequency error.

As shown in FIG. 3 operating two distinct feedback control paths from the phase detector or binary encoder through the feedback error legs $K_i$ (integrated phase, or frequency) and $K_p$ (phase) is such that correction of the phase error can be accomplished during a single clock cycle of the regenerated clock after the appearance of an output from the phase detector representing an early/late decision, provided that the processing through the $K_p$ accumulator and finite state element are completed in one clock cycle, i.e., updated once per bit. The update rate for the $K_i$ accumulator and finite state element is once per 8 data bits in this example.

Figure 4:
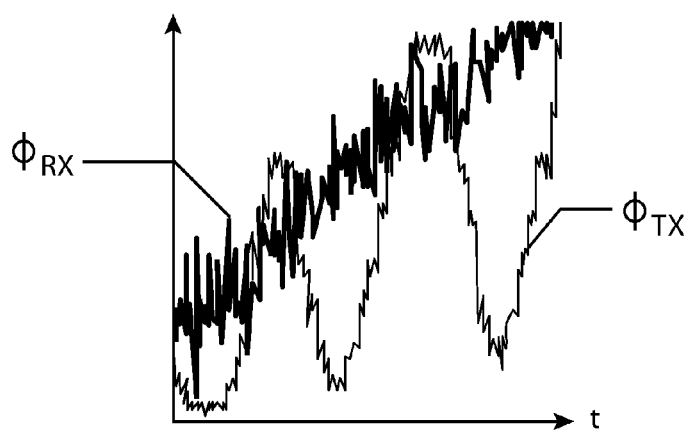
FIG. 4 is an exemplary timing diagram showing phase and frequency tracking between transmitting and receiving clocks in a plesiochronous configuration.

FIG. 4 is a timing diagram showing the tracking of frequency drift and phase drift between a transmit oscillator and a regenerated receiver oscillator. The diagram specifically shows the transmit oscillator phase $\phi_{TX}$ and regenerated receiver oscillator phase $\phi_{RX}$ (the phase of RX clock), compared to an ideal non-varying reference. In this example, the transmit oscillator phase $\phi_{TX}$ is seen to wander periodically and also to have a generally upward trend. An alternating difference in phase is simply a phase error, whereas a trend represented by an increasing difference in phase is a frequency error. The second order filter 60 as disclosed adjusts the phase $\phi_{RX}$ of the regenerated clock RX clock to track the changing phase $\phi_{TX}$ of the transmitter, as discerned from the transitions in the serial data stream. The general upward slope of the transmit signal phase $\phi_{TX}$ is an indication of a difference in frequency being tracked by the regenerated receiver along substantially the same slope, i.e., predicting the same frequency as the transmitter clock. While the frequency correction leg 64 of the second order filter 60 integrates over plural clock cycles for responding to the frequency difference, the phase correction leg 62 likewise seeks to predict the phase position of the next clock cycle and/or the optimal phase positions at which to sample the level of the serial data signal 20.

Figure 5:
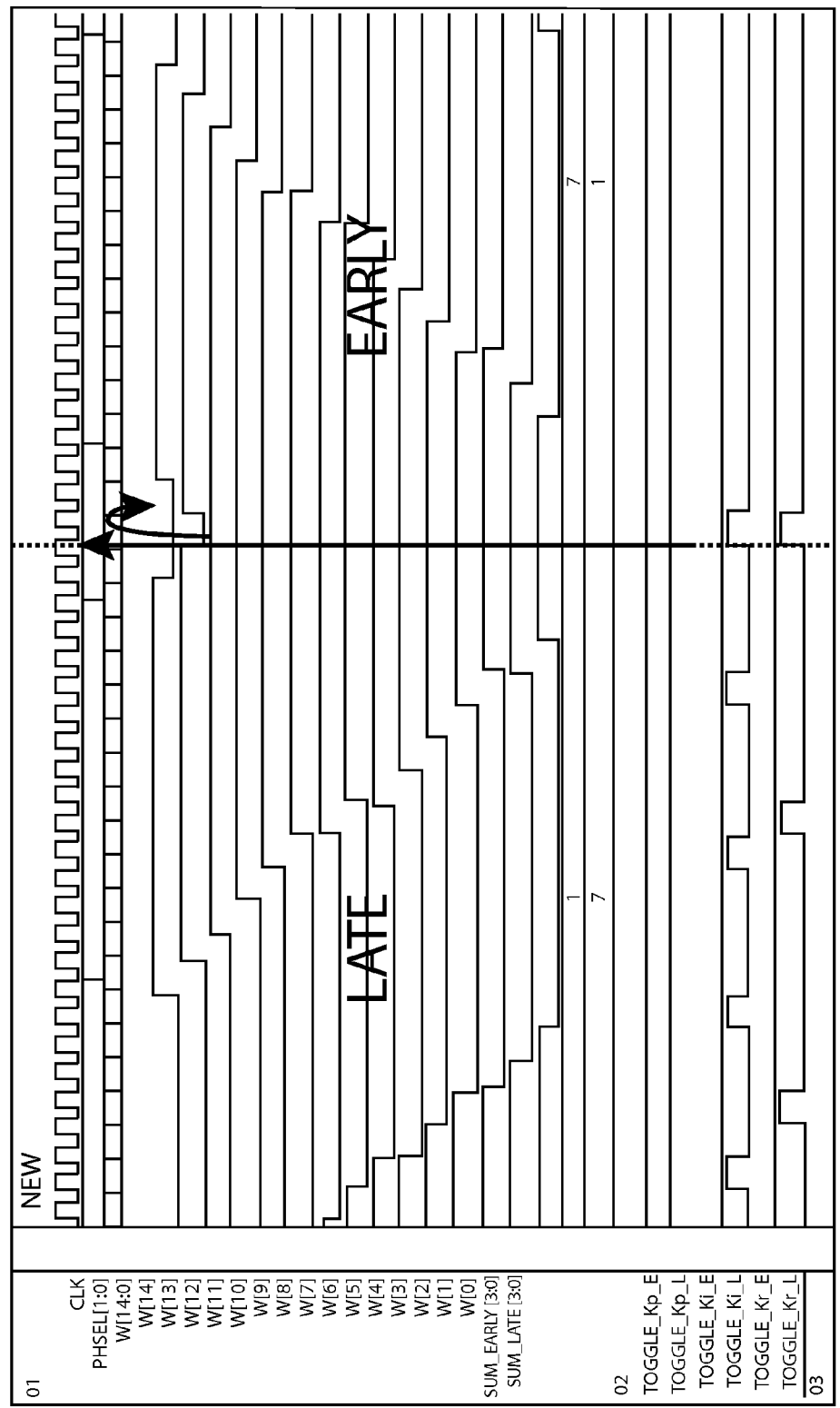
FIG. 5 is a timing diagram illustrating the adjustment of phase interpolation outputs as characterized by this disclosure, in a CDR at the point of cross over from early to late majority phase error detection, the phase correction becoming nominal after one clock cycle latency.
Figure 6:
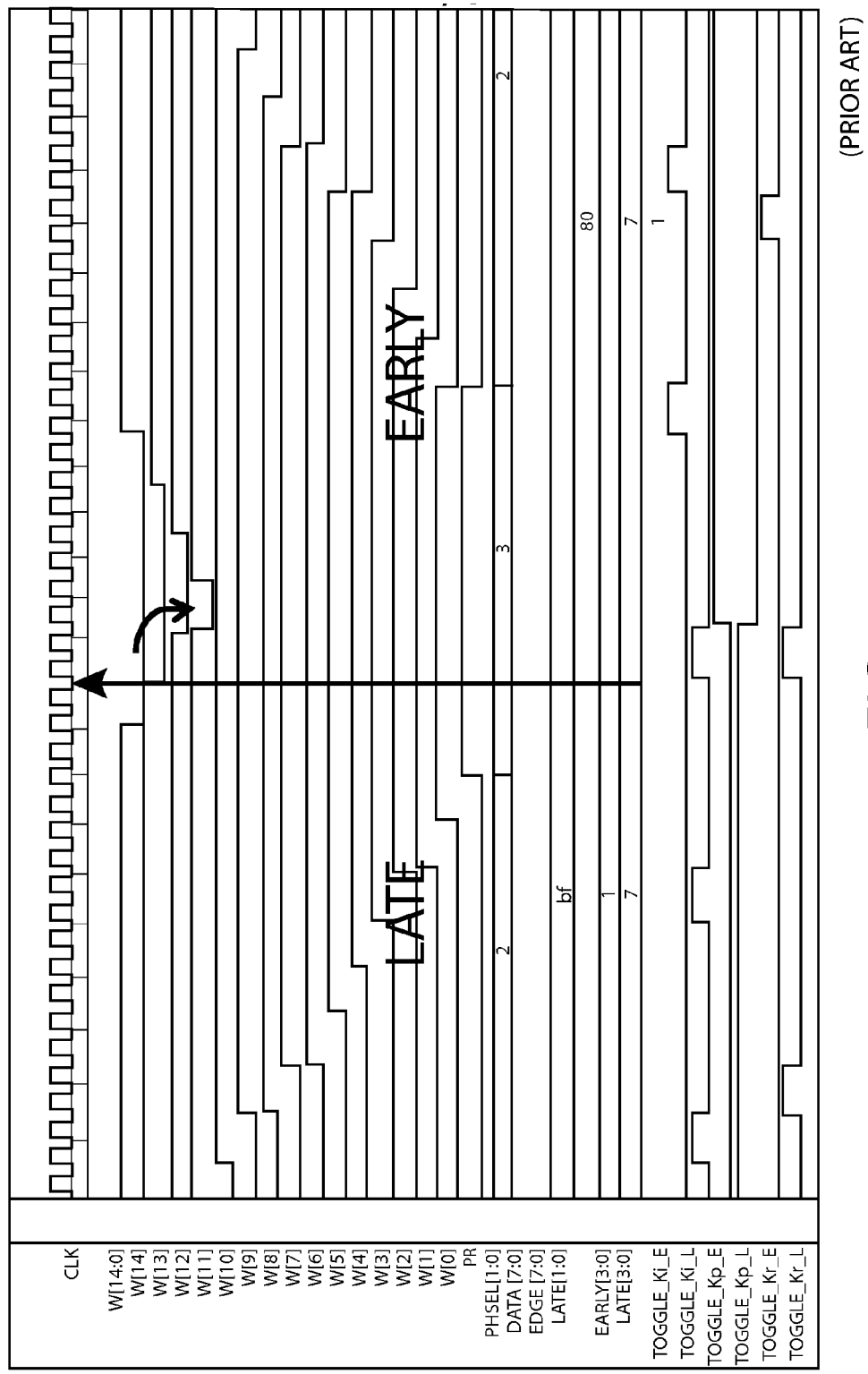
FIG. 6 is a timing diagram at the point of cross over as in FIG. 5 but wherein the phase and frequency control loops are operated at the same updating frequency, wherein the phase correction becomes nominal after several clock cycles.

FIGS. 5 and 6 are time plots showing the regenerated clock and a series of sub-phase signals. Of interest are the sub-phases following a phase drift that passes one cycle in the signal ($2\pi$ radians), shown by a vertical arrow. In FIG. 5, a phase correction error is made promptly and fully within a clock cycle after passing the full cycle of relative phase displacement. In FIG. 6, however (labeled as prior art), the phase correction steps back over eight clock cycles, because in this case the latency of the phase correction error loop, like that of the frequency correction is eight clock cycles rather than one.

Figure 7:
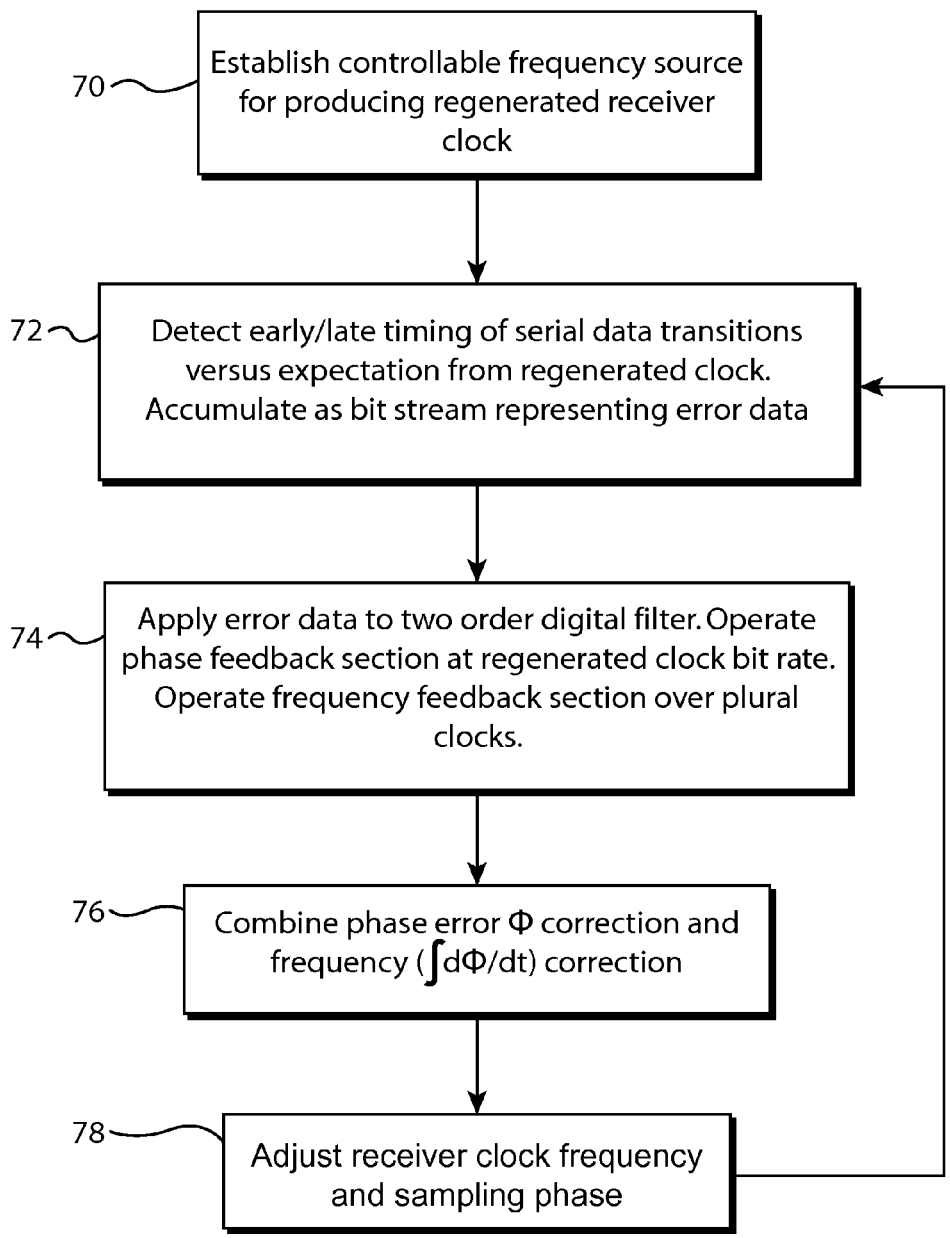
FIG. 7 is a flow chart showing the steps undertaken as described.

FIG. 7 shows the present subject matter in the form of flow chart steps. At step 70, a controllable frequency source is provided for the regenerated receiver clock. The source can include or be associated with a set phase-displaced sources, such as a set of 16 phase divisions spaced by 22.5 degrees and used for synchronizing operations of the digital filter. Additionally, a phase interpolator can be arranged to produce an output signal at a numerically determined space between two phase divisions, for fine tuning a phase position at which the serial data stream is sampled.

At step 72, incidences of early or late timing of transitions are detected in the serial data versus expectations as to where the transitions are expected to occur based on the regenerated clock. The results of early/late detections are passed along as a bit stream (0 for early and 1 for late, or vice versa) and provide the raw feedback error data that is applied (at step 74) to the second order digital filter as a digital input. The digital filter operates on the error data according to longer and shorter cycles in two feedback legs (hence the designation "second order"), the outputs of which are combined (step 76), namely corrections of differences in phase $\phi$ and also in frequency, which is the integration of phase difference ($\int d\phi/dt$). A feedback leg sensitive to frequency difference operates over a larger number of clock cycles than a phase sensitive leg. However the output value from both legs, which is expresses as a phase difference for operating the phase interpolator, updates to adjust the receiver RX clock at every clock cycle (step 78).

A plesiochronous serial data transmission system that lacks a synchronizing clock signal path can have multiple serial bit streams transmitted simultaneously over parallel data paths (i.e., over a data path that is not strictly serial), with timing for plural synchronized serial streams derived from data transitions in at least one such serial bit stream. The regenerated clock for at least one such serial stream, or phase divisions of the regenerated clock can control sampling of all the serial streams that were encoded according to the same clock signal or a set of synchronized clock signals.

Accordingly, a clock data recovery apparatus 41 is disclosed for extracting successive bit data values from a serial bit data stream 20 encoded with level transitions occurring between at least some successive bits in the bit data values. The level transitions conform to a transmit frequency and a transmit phase position. The apparatus includes a controllable oscillator 52, a phase detector 56, and a feedback loop with two legs 62, 64, that are respectively responsive to phase and frequency.

The controllable oscillator 52 produces a regenerated clock signal having level transitions within a controllable frequency range encompassing the transmit frequency. The controllable oscillator is responsive to a control input, shown in FIG. 2 as the output of phase interpolator/selector 58. For producing a feedback signal for the control input, a phase detector 56 is operable to detect a timing relationship between the level transitions of the regenerated clock signal versus the level transitions occurring between the bit data values (the serial data input in FIG. 2). The phase detector produces an output (00, 01, 11, for example), representing a phase timing difference between the serial data stream and the controllable oscillator. The feedback control has an output (from phase accumulator 63) coupled to the control input of the controllable oscillator 58 and having two feedback loops 62, 64 respectively configured to minimize phase and frequency error. At least the feedback loop 64 for minimizing the frequency error operates on a succession of multiple cycles of the regenerated clock representing multiple bits of the successive bits in the bit data values. The feedback loop for minimizing the phase error operates on fewer cycles of the regenerated clock, such as individual cycles for example, whereby the clock data recovery apparatus has a shorter feedback control latency for phase than for frequency.

The disclosed device can be regarded as a plesiochronous timing configuration for recovering at least one of a clock signal and a data bit stream from a serial data bit stream synchronized to a transmitter clock 32 (FIG. 1) and having level transitions occurring between changing bit values. On the receive side 24, a receiver 41 is coupled to the serial data bit stream, but lacks external synchronization with the transmitter clock (i.e., lacks synchronization apart from the data bit stream itself. A clock data recovery circuit as shown in FIG. 2 has a controllable oscillator 52 producing a regenerated clock signal (RX clock) having level transitions, a phase detector 56 operable to compare a timing of the level transitions in the regenerated clock signal to the level transitions in the serial data input bit stream to produce an error signal (00, 01, 11). A feedback control is responsive to the error signal, and a phase interpolator is responsive to the feedback control, to adjust the controllable oscillator. The feedback control comprises a second order filter with two control loops 62, 64, respectively responsive to frequency and phase errors. The control loop 62 responsive to phase errors is operated at a faster rate than the control loop 64 responsive to frequency errors.

The disclosure further concerns the associated method for extracting data from a serial bit data stream containing variable bit data values encoded using level transitions conforming to a bit frequency and a phase. This method includes producing a regenerated clock signal (RX clock) from a controllable frequency source 52 having a frequency control range encompassing the bit frequency. An early-or-late timing relationship is detected between transitions in the regenerated clock signal (RX clock) and transitions that occur between at least some of the bit data values in the serial data input. The data values representing the early-or-late relationship for successive cycles of the regenerated clock are accumulated and scaled ($K_p$, P-acc and $K_i$, I-acc), in two distinct feedback control paths that estimate a frequency error and a phase error between the regenerated clock (RX clock) and the serial bit data stream. The feedback path applies phase correction to the regenerated clock (RX clock) for at least one of: offsetting the frequency error; offsetting the phase error; selecting a reference sub-phase for sampling the bit data values in the serial bit data stream; and triggering sampling of the bit data values in the serial bit data stream. The feedback path operates the two distinct feedback control paths with distinct latencies, such that correction of the phase error encompasses fewer cycles of the regenerated clock than correction of the frequency error.

The present subject matter has been disclosed and illustrated in a number of examples, the aspects of which are also capable of embodiment in other ways in keeping with this disclosure. Reference should be made to the appended claims as opposed to the exemplary embodiments, in order to assess the scope of the invention in which exclusive rights are claimed.

What is claimed is:

1. A clock data recovery apparatus for extracting successive bit data values from a serial bit data stream encoded with level transitions occurring between at least some successive bits in the bit data values, the level transitions conforming to a transmit frequency and a transmit phase position, the apparatus comprising:
a controllable oscillator producing a regenerated clock signal having level transitions within a controllable frequency range encompassing the transmit frequency, wherein the controllable oscillator is responsive to a control input;
a phase detector operable to detect a timing relationship between the level transitions of the regenerated clock signal received at the phase detector versus the level transitions occurring between the bit data values received at the phase detector, the phase detector producing an output representing a phase timing difference between the serial data stream and the controllable oscillator;
a feedback control having an output coupled to the control input of the controllable oscillator and having two feedback loops respectively configured to minimize phase and frequency error;
wherein at least the feedback loop for minimizing said frequency error operates on a succession of multiple cycles of the regenerated clock representing multiple bits of the successive bits in the bit data values; and,
wherein the feedback loop for minimizing said phase error operates on individual cycles of the regenerated clock, whereby the clock data recovery apparatus has a shorter feedback control latency for phase than for frequency.

2. The clock data recovery apparatus of claim 1, further comprising a phase interpolator coupled to the feedback control, wherein the phase interpolator responsive to the feedback control for at least one of selecting a phase of the regenerated clock signal, adjusting a phase of the regenerated clock signal, and timing sampling of the bit data values in the serial bit data stream.

3. The clock data recovery apparatus of claim 1, wherein said outputs of the phase detector for successive cycles of the regenerated clock are shifted through the feedback control in a pipeline succession.

4. The clock data recovery apparatus of claim 1, wherein the feedback loop for minimizing said frequency error operates on a number of successive bits corresponding to a digital word.

5. The clock data recovery apparatus of claim 1, wherein the feedback control comprises a second order filter with two control loops respectively responsive to frequency and phase errors, the two control loops having distinct gains and transfer functions, and outputs of the two control loops being combined in a numerical output coupled to a phase interpolator.

6. The clock data recovery apparatus of claim 1, wherein the phase detector comprises a bang-bang comparison circuit producing for each level transition in the data bit stream an indication of whether the level transition in the data stream was early or late compared to a transition in the regenerated clock signal.

7. A plesiochronous timing configuration for recovering at least one of a clock signal and a data bit stream from a serial data bit stream synchronized to a transmitter clock and having level transitions occurring between changing bit values, comprising:
a receiver coupled to the serial data bit stream, the receiver lacking external synchronization with the transmitter clock;
a clock data recovery circuit having a controllable oscillator producing a regenerated clock signal having level transitions, a phase detector operable to compare a timing of the level transitions in the regenerated clock signal received at the phase detector to the level transitions in the serial data bit stream received at the phase detector to produce an error signal, a feedback control responsive to the error signal, and a phase interpolator responsive to the feedback control operable to adjust the controllable oscillator;

wherein the feedback control comprises a second order filter with two control loops respectively responsive to frequency and phase errors; and, wherein the control loop responsive to phase errors is operated on individual cycles of the regenerated clock and at a faster rate than the control loop responsive to frequency errors.

8. The timing configuration of claim 7, further comprising a timing circuit producing a sampling trigger with a phase relationship to the regenerated clock.

9. The timing configuration of claim 8, produced by one of a delay, selection of a sub-phase, and operation of a phase interpolator to select a phase position between sub-phases.

10. The timing configuration of claim 9, further comprising a data level sampling device operable to load the level at least at one of 90 and 270 degrees from a transition.

11. The timing configuration of claim 7, wherein the phase detector comprises a bang-bang comparison circuit producing for each level transition in the data bit stream an indication of whether the level transition in the data stream was early or late compared to a transition in the regenerated clock signal.

12. The timing configuration of claim 11, further comprising accumulator operable store the indication from the phase indicator for plural successive transitions.

13. The timing configuration of claim 7, wherein the accumulator stores indications for bits over cycle of data word.

14. The timing configuration of claim 13, wherein the frequency loop is updated once per data word.

15. A method for extracting data from a serial bit data stream containing variable bit data values encoded using level transitions conforming to a bit frequency and a phase, the method comprising:

producing a regenerated clock signal from a controllable frequency source having a frequency control range encompassing the bit frequency;

detecting an early-or-late timing relationship between transitions in the regenerated clock signal received at a phase detector and transitions that occur between at least some of the bit data values received at the phase detector;

accumulating data values representing the early-or-late relationship for successive cycles of the regenerated clock, and estimating in two distinct feedback control paths a frequency error and a phase error between the regenerated clock and the serial bit data stream;

applying a phase correction to the regenerated clock for at least one of offsetting the frequency error, offsetting the phase error, selecting a reference sub-phase for sampling the bit data values in the serial bit data stream, and triggering sampling of the bit data values in the serial bit data stream; and, further comprising operating the two distinct feedback control paths such that correction of the phase error encompasses single cycles of the regenerated clock and fewer cycles of the regenerated clock than correction of the frequency error.

16. The method of claim 15, further comprising combining correction signals for offsetting the frequency error and the phase error, and applying a resulting phase correction to the regenerated clock.

17. The method of claim 15, wherein the two distinct feedback control paths update phase and frequency correction signals at different rates.

18. The method of claim 15, wherein the two distinct feedback control paths update phase and frequency correction signals at a same rate but the phase and frequency corrections are based on fewer clock cycles for phase correction than frequency correction.

* * * * *